United States Patent [19]

Sampsell

[11] Patent Number: 5,452,024
[45] Date of Patent: Sep. 19, 1995

[54] DMD DISPLAY SYSTEM

[75] Inventor: Jeffrey B. Sampsell, Plano, Tex.

[73] Assignee: Texas Instruments Incorporated, Dallas, Tex.

[21] Appl. No.: 146,385

[22] Filed: Nov. 1, 1993

[51] Int. Cl.⁶ .............................................. H04N 5/74
[52] U.S. Cl. ................................... 348/755; 348/764; 348/770; 359/224; 345/84
[58] Field of Search ............... 348/755, 750, 764, 770, 348/771, 772, 773, 774, 775, 765, 739, 742, 743, 744, 756, 757, 758, 759, 760; H04N 5/74; 345/206, 200, 201, 30, 31; 359/223, 224, 225, 212-214, 238, 242, 261, 263, 264, 846, 847, 848, 849

[56] References Cited

U.S. PATENT DOCUMENTS

| | | | |
|---|---|---|---|
| 4,956,619 | 9/1990 | Hornbeck | 348/771 |
| 5,061,049 | 10/1991 | Hornbeck | |
| 5,079,544 | 1/1992 | Thompson et al. | |
| 5,212,582 | 5/1993 | Nelson | 348/771 |
| 5,255,100 | 10/1993 | Urbanas | 348/770 |
| 5,278,652 | 1/1994 | Sampsell et al. | |

OTHER PUBLICATIONS

"The Digital Micromirror Device and Its Application to Projection Displays" Dr. Jeffrey Sampsell, presented at Transducer Conference in Japan 1993 and the Society For Information Displays in Seattle, 1993.

"The Digital Micromirror Device (DMD) and Its Transition to HDTV" at the European Information Display Conference, 1993.

Primary Examiner—James J. Groody
Assistant Examiner—Michael H. Lee
Attorney, Agent, or Firm—Julie L. Reed; James C. Kesterson; Richard L. Donaldson

[57] ABSTRACT

A digital video display system (100). The system receives digital data from either broadcast video (102) or an alternate source (107), in either analog or digital form. The system processes the data into display data and loads the data onto a digital micromirror device (112). The data is either formatted for color-sequencing or separated into color data for separate devices. The data causes the individual cells on the device to respond and then they are illuminated. The light coming from deflected cells is displayed on a display surface.

26 Claims, 7 Drawing Sheets

DMD DISPLAY SYSTEM

BACKGROUND OF THE INVENTION

1. Field of the Invention

This invention relates to displays, more specifically to High Definition Displays (HDD) or High Definition Television (HDTV) displays.

2. Background of the Invention

HDTV has pointed out problems with several current technologies in the display area as these technologies attempt to adapt to the demands of the new standards. The main types of display systems are cathode-ray tubes (CRT), and liquid crystal displays (LCD). Each of these have weaknesses that HDTV requirements make more obvious.

CRT

The cathode-ray tube display is probably the most common type of display, with worldwide acceptance as televisions, computer monitors and many different display tasks. CRTs typically function with an electron gun or guns that sweep from side to side across the back side of a piece of glass that has been treated with various phosphors. The phosphors glow when the energy from a gun touches them, and creates the images on the screen. The current U.S. TV standard (NTSC) displays images across approximately 480 horizontal lines. The image data is interleaved, meaning that the odd-numbered lines are displayed in one time interval and the even in another. (The current European standard is similar, having approximately 576 horizontal lines.) In the NTSC standard the time interval is 16.7 milliseconds. This time allows the gun to "dwell" on any particular pixel spot on the screen for a finite amount of time.

The times and line counts mentioned above are for current, standard resolution television. However, some HDTV and EDTV (enhanced definition television) standards are not interleaved, but progressively scanned. This means that the data is displayed in line order as 1, 2, 3 ... etc. Therefore, in the time formerly available to display 240 lines, EDTV and HDTV must display 480 or 960 lines respectively. In this situation the pixel dwell time has dropped by a factor of two or four respectively, lowering the brightness of each pixel, since it will receive less energy. Additionally, HDTV has an aspect ratio of 16:9 instead of 4:3, making the lines even longer, resulting in less time per pixel.

Therefore, the use of a CRT in HDTV might not be satisfactory. Unless some sort of compensation is made, the brightness will drop by at least a factor of four. Since CRTs are a mature technology, there is little chance that a massive industry effort can achieve the brightness levels of standard CRTs in HDTV displays. The resulting HDTV display will compare very poorly to standard television sets in brightness, and consumer acceptance would be poor. For reasons such as those discussed above, CRTs do not appear to be a truly feasible choice for HDTV, and one must turn to LCDs.

LCDs

Liquid crystal displays have a large advantage because they have individually addressable cells. These individual cells become individually controllable picture elements, or pixels, in the display environment. To adapt to HDTV, the number of cells must increase, but there is not necessarily any loss of brightness associated with this pixel increase. However, LCDs have other interrelated problems. First, they have low manufacturing yields and therefore are expensive. Second, they have low transmission efficiency. Third and fourth, they have long response times and low contrast ratios.

Several factors contribute to high LCD costs. The biggest factor is low yield in the fabrication steps. The pixel addressing transistors must be made on a glass substrate. Typically, these substrates are large and difficult to handle and usually cannot share standard silicon processing techniques or use standard silicon processing equipment. Therefore, the fabrication process cannot benefit from the economy of scale of the silicon processing industry. Complete LCDs require intricate physical assembly and again cannot share the equivalent silicon packaging process. Additionally, LCD materials are expensive in and of themselves.

LCDs typically consist of two glass panels with the crystalline material sandwiched between them. One or both of the glass panels have transistors functioning as electrodes that activate the crystalline material. When the electrode is activated, the crystals, which are aligned along a polar axis, twist, layer by layer. The effect is that the light entering through a polarizer on one side of the LCD travels through the twisted crystals and is absorbed in a second polarizer, causing dark pixels. The light must be polarized before entering the crystal matrix. Typically, a polarizing coating on the front panel of the display accomplishes this. Absorption in these two polarizers typically accounts for a loss of over 60% of the incident illumination, making LCDs inefficient.

The process of twisting crystals is in itself a problem. The response time of the crystals to the electrode signals is slow, on the order of 30 milliseconds. As mentioned above, HDTV will require faster, not slower, response times in the display because of the higher amount of information required for the display. Since the LCD relies upon the extinction of transmitted light within the display itself, heating of the device through absorbed radiation is a concern. Also LCDs have low percentage active areas that lead to further inefficiency.

Because of the high cost, low efficiency, slow response time and low contrast ratio, LCDs are undesirable for HDTV. HDTV must be accessible to a broad spectrum of consumers, and must produce a noticeable difference from the present day television sets. Such an advantage will be difficult for LCDs and CRTs to achieve.

Therefore, HDTV requires a display technology that has good brightness, low cost, ease of manufacturing and flexibility to adjust to different standards of television broadcast formats.

SUMMARY OF THE INVENTION

A display system using digital micromirror devices is disclosed herein. The system includes a source of digitized video data, which could be broadcast video, in either digital format, or analog that is then converted to digital, or other sources, such as computer display data. The source is received, the format identified and the format used in the digitization, if any of the signal. The digitized data is then stored in a video memory, processed to fit on the display, and sent to a buffer memory. The buffer memory then outputs the data to a DMD array, upon which the picture is displayed.

It is an advantage of the system that it can display several sources of data, including several formats such as HDTV, NTSC and VGA. It is a further advantage that the system produces a higher resolution picture.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION

Figure 1:
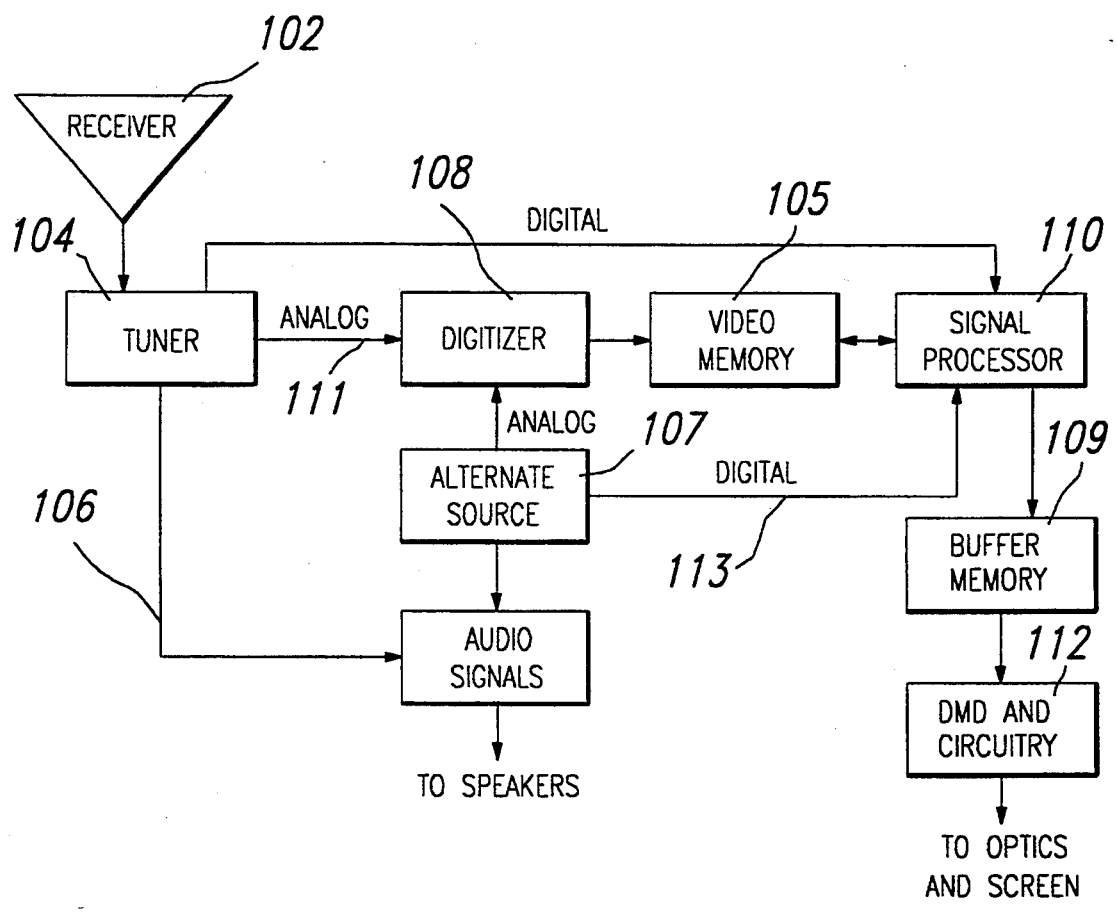
FIG. 1 shows a block diagram of a DMD display system.

FIG. 1 shows a general overview of a digital television or display system 100. The signal is received at antenna/receiver 102. The receiver 102 passes the signal to the tuner unit 104 which separates the audio and video signals from the carrier signal. The audio portion is then passed along a separate track 106 to be resynchronized with the video signal and will not be discussed. The tuner circuitry can be designed to recognize and decode multiple video standards so that the output video is presented in consistent formats regardless of the incoming video standard.

A phase quadratic decoder or other such decoder can be used to separate the video signal into chrominance and luminance information, and further processing can derive component video signals consisting of individual frames of red, green, and blue signal information. Although it is possible to manufacture both analog DMD and digital DMD systems, for reasons discussed below, the digital micromirror device (DMD, this also know as the Deformable Mirror Device, for discussion purposes, we will refer to both as digital micromirror devices) is preferably operated digitally, so the data then passes into the digitizer 108 which converts it into digital words for each pixel. The word length depends on the desired color and intensity resolution of the system. For example, a system with 8-bit resolution in each color would have a 24-bit (3 colors×8 bits) data path. The digitized data is stored in memory 105 and then passed to signal processor 110.

The display system described herein can project images from an alternate video source such as source 107. Source 107 may provide computer generated images as well as the video images described above. The video described above that is originally received by antenna/receiver 102 will be referred to as "broadcast" video, to distinguish it from alternate video sources as shown by 107. Alternate video information may enter the display system in an analog format in path 111, or in a digital format in path 113.

For a digital DMD based display system the primary requirement for the incoming source signal is that it must be digital before reaching the DMD. Receiver 102 and tuner 104 could be a digital source by themselves if the broadcast video standard is digital, as proposed for US HDTV. With an analog standard input, the digital source would comprise receiver 102, tuner 104 and digitizer 108. Similarly, the alternate source 107 could be a digital source by itself, or, with an analog input, the digital source would comprises alternate source 107 and digitizer 108.

For reasons that will be explained below the DMD displays video information in frame-at-a-time-fashion. Since many video standards consist of interlaced fields which are spatially and temporally composed to create frame images the signal processor must accomplish field-to-field spatial and temporal interpolation as required by the video standard being displayed. Many different algorithms to accomplish such conversions have been proposed.

In addition to interlace-to-progressive conversion other signal processing may be necessary. Various artifacts can appear when displaying digital data, such as abrupt edges instead of smooth transitions. The signal processor can alleviate these problems by applying various data-manipulation algorithms. The signal processor can also implement standard video functions such as gamma correction and tint, color, brightness, sharpness, and contrast control. Additionally, if it was not done previously, the signal processor unit can accomplish the composite to component video conversion. When the signal processor has completed preparing the data for display, the signal processor places the processed data in memory 109 where it remains until sent to the DMD.

For reasons that will become obvious, the sequencing of the digital data onto the DMD is critical to the operation of the display system and is not similar to the pixel-by-pixel, line-by-line manner in which the data is supplied by the video standard. Therefore, a key component of the signal processing function is the proper sequencing of the data as it flows from the memory 109 to the DMD module 112. The module 112 includes both the DMD array of individually addressable mirror cells and associated memory circuits which store the image data until it is ready to be sequenced onto the DMD array.

After the processed data is sequenced (loaded) onto the DMD, the array is illuminated by an optical source in combination with condensing and illuminating optics. The light reflected from DMD mirrors in the appropriate deflected state is relayed to a viewing screen through projection optics. As mentioned above, it is possible to build such an optical system using both analog and digital DMDs. In analog DMD embodiments the deflection of the mirror cell varies with the amount of voltage applied. This is typically performed using either a membrane DMD operating in the analog domain (they can also operate digitally), consisting of a thin reflective membrane over a grid of supports, or a "beam" DMD, consisting of mirrors on hinges. The beam DMDs will be discussed relative to FIG. 4. The deflection in the case of a membrane DMD is more on the order of a localized deformation of a monolithic membrane. An example of these systems can be found in U.S. Pat. Nos. 4,680,579 and 4,638,309, both issued to Ott.

There is a significant limitation to the use of analog DMDs of this type in display systems, especially HDTV systems. Since DMDs are fabricated in conventional semiconductor wafer fabrication areas, the thickness of the mirror materials that can be used, usually some type of highly reflective metal like aluminum, can vary up to 5% across the device. In beam type devices, the variation of the angle of mirror deflection with applied voltage is proportional to the variation of the cube of the thickness with the variation in thickness.

This results in a 15% difference in the deflection characteristics across the device with a 5% variation in material thickness. It would be difficult to obtain uniform light modulation with switching elements undergoing non-uniform deflection.

Digital operation eliminates this problem, since, in a beam-type DMD, the ON or "1" state is fully tilted at one of two uniform angles, and the OFF or "0" state is at the other of the two angles. Likewise, with membrane-type DMDs, there are two distinct states, each of which represents one of the two digital conditions (ON or OFF). These two states include a fiat state and a fully deformed state.

In a digital mode the fast switching time of the DMD mirrors allow them to change between positions that either reflect light into a set of projection optics, thus increasing the intensity of the displayed image, or reflect light away from the projection optics. The detailed operation of the device in digital mode will be discussed later. Fundamentally, each mirror of the device, which corresponds to a particular pixel in the projected image operates in a binary manner where each mirror cell switches ON and OFF. The more time a mirror spends in the ON state the brighter the corresponding pixel will be.

The ON times are directly proportional to the intensity levels of the digitized images. The viewer's eye integrates the time varying intensity levels projected onto the screen at each pixel location to create the impression of a complete analog image. If a time variant color filter (such as a color wheel) is used, and the appropriate red, green, and blue intensities are synchronized to red, green, and blue filtered illumination, one DMD can create a full color image in this fashion. Several options are available using a digital DMD including a 3-chip system, one for each color, a one-chip system using a filter such as a color wheel, and even a 2-chip system, where one device switches between two colors and the second projects one color. The optical considerations will be discussed further in FIGS. 7a-7c.

Using a device that relies upon the viewer's eye for integration of brightness and color brings up problems of bandwidth. The device must be fast enough to switch and display all of the image data in all of the colors without any perceivable flicker. A system having 3 DMDs, one for each color, would have lower bandwidth. The 3 DMDs could actually be physically separate chips or 3 regions on one large device, but significant bandwidth would still be required to switch hundreds of thousands of mirrors on and off hundreds of times during each 16.7 ms video frame.

The three-chip approach allows a reduction of bandwidth relative to the single chip approach, but such an approach incurs extra cost. Assuming a processed silicon wafer cost of $1000, a chip sized such that 12 chips can fit on a wafer, and 33% chip yield, each device costs $250. The cost of a packaged chip might be approximately $350. The cost of a 3-chip system would then be $1050 before any other electronic function requirements are considered. This does not seem to be an acceptable start to a consumer-available system. Another option would be to have 3 regions on the same device. However, the device size would now be tripled, allowing only 4 device per wafer. The same assumed yield results in 1 device per wafer at $1000, without packaging.

Raising the yield would of course lower this cost, but until costs can be substantially reduced, using a color-sequencing method with one device would seem preferable. Concern then returns to the question of bandwidth, namely can a reasonable chip be built with enough I/O capability to achieve a full-color image at the necessary video rates? Since a single frame time is 16.7 milliseconds, each color has one-third of a frame, or 5.5 milliseconds for display. To achieve eight bits of color resolution these 5500 microseconds must be divided into 256 individual time windows of 21 microsecond duration. The digital DMD has an in-motion or "flight" time of 10 microseconds. Therefore, enough time is available to allow the DMD to move from one state to another, be ON or OFF for that time slice, and then return.

In order for the entire DMD to be addressed in this 21 microsecond period a high data I/O bandwidth must be provided. One potential configuration for a 2048×1152 pixel device provides 512 input pins at the top of the device and 512 pins at the bottom of the device, with each input demultiplexed at a one-to-four factor. When four bits of data are loaded into each pin, two complete 2048 bit lines of data can be loaded into the DMD pixel array. To address the device in 21 microseconds, each of the 576 rows in the top and bottom of the device must be addressed in 36 nanoseconds (ns). To provide 4 bits to each pin in 36 ns requires a data rate of 111 MHz ($4/36 \times 10^{-9}$) per pin. These pin counts and data rates, although challenging, can be achieved, showing that a single chip DMD-based, all digital HD resolution display system is achievable.

In would be inconvenient for a DMD with 512 input pins to be mounted remotely from the memories that provide its input signal, and it may be inconvenient for a circuit board of a size to hold the DMD, the memories, and the signal processing circuits to be integrated into the optical system. Hence, it will probably be preferable to integrate the DMD and memories into a hybrid module remote from the signal processing board. One possible configuration for this module has been disclosed.

Figure 2:
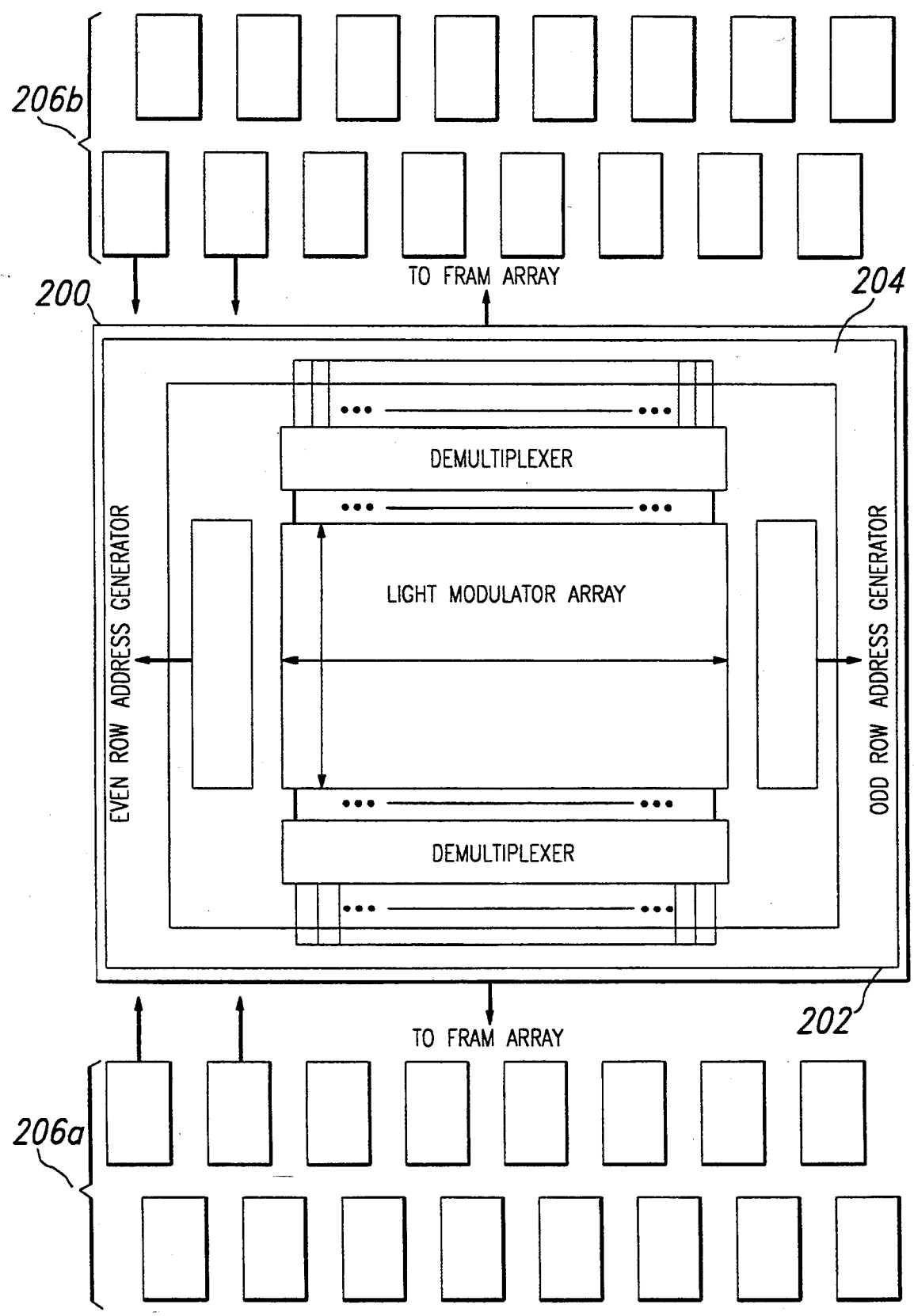
FIG. 2 shows a typical superstrate on which the array resides.

The DMD would typically be mounted to a ceramic chip carrier 200 such as the one shown in FIG. 2. The device is surrounded by a ring 202 that supports a protective window 204, and an inert gas environment is sealed between the window and the ceramic substrate. The DMD input ports are bonded to traces that pass under the ring and interconnect the chip with 32 frame buffer RAMs 206a and 206b. The frame buffer RAMs (FRAMs) are constantly refreshing the DMD with intensity data for red, green or blue at each of 2.36 million pixels. These buffers could be any type of random access memory (RAM), such as video random access memories (VRAMs), or first-in-first-out (FIFO) buffers. In this embodiment, 7-bit data is assumed, which requires a total FRAM capacity of 49.5 million bits (3 frames×2048×1152×7 bits). Thus, each of the 32 FRAMs would be of 1.55 Mbit capacity. Eight-bit video data would require 32 FRAMs of 1.77 Mbit capacity. Current memory technology is not challenged by these requirements.

Figure 3:
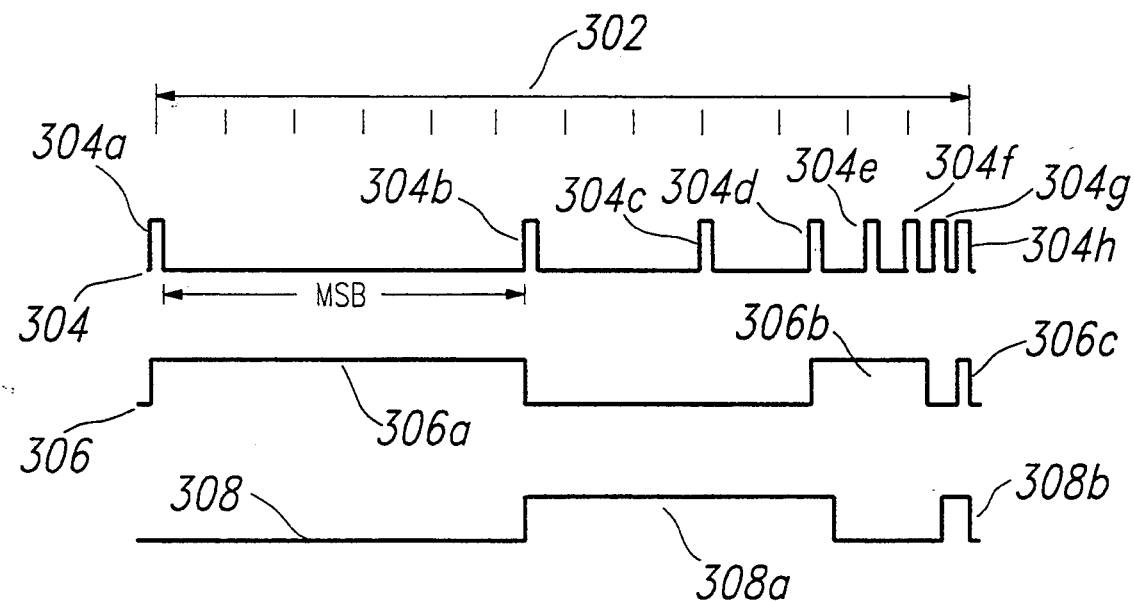
FIG. 3 shows a gray scale timing diagram.

Each FRAM would feed 32 of the DMD input pins, and each row of DMD pixels would be addressed in turn by a series of varying-length clock pulses. As shown in FIG. 3, the most significant intensity bit (MSB) is loaded into a pixel for a period approximately half the duration of the refresh period, the second MSB for a period one-quarter of the refresh period, and so on. The digital intensity value is thus used to directly address the pixel's duty cycle. The two banks of FRAMs must be updated every 16.7 ms, requiring a data rate of 3.4 Gbit per second for an 8-bit system. An assumption of quadruple 32-bit data buses feeding each of the four display quadrants yields a 26.5 MHz per wire data rate, a fully achievable rate.

Figure 4:
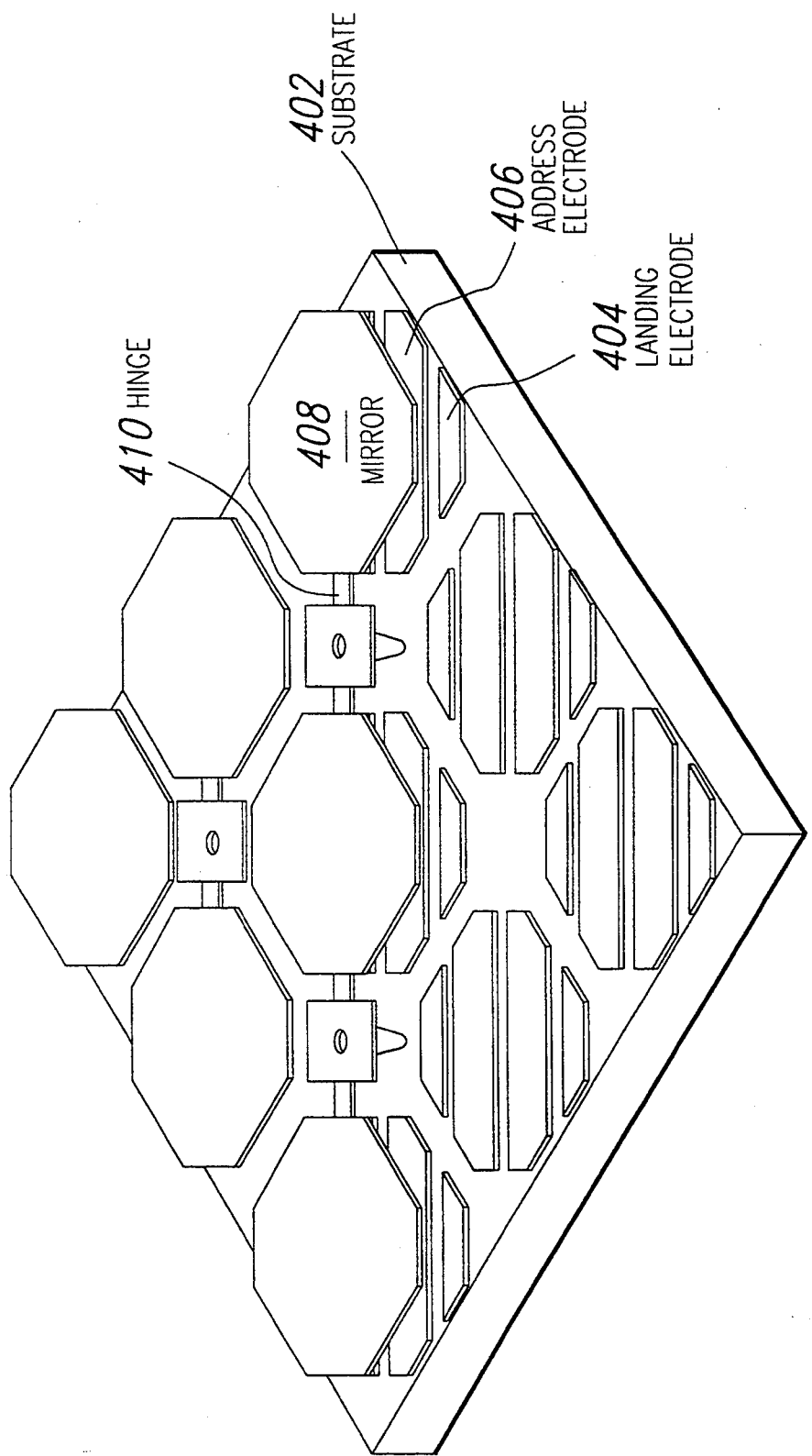
FIG. 4 shows a perspective view of a DMD array.

Having determined that digital color operation is possible and that an appropriate DMD and support circuits can be realized, it becomes helpful to discuss DMD operation in some detail. FIG. 4 shows a piece of an array 400. The substrate 402 is typically silicon, with CMOS addressing circuitry. On top of the addressing circuitry rests a metal layer appropriately patterned for landing and address electrodes, 404 and 406 respectively.

A typical processing sequence for the mirror elements 408 suspended above the electrodes is described below. The electrodes are coated with a layer of polymer approximately 2 microns thick and then the polymer coating is hardened. The polymer is patterned to form vias leading to the underlying substrate. The hinge metal 410 is then deposited and a layer of oxide is deposited over the hinge layer and patterned in the shape of the hinges that will be formed later in the process. A thicker layer of metal is deposited over the oxide hinge mask. The top surface of this layer is the mirror surface. The two layers of metal, where they have filled the previously patterned vias, form posts that will eventually support the mirror layer above the substrate. The mirror metal is then patterned, and the oxide layer protects the thin hinge metal from being removed during this etch. The array can be plasma etched to remove the polymer just underneath the mirrors, leaving the hinges to connect the mirrors to the tops of the post/vias.

The above architecture of the DMD is called the torsion-hinge. Other architectures exist, including the cantilever beam, which is supported by one hinge, and the flexure beam which is supported by four hinges. The cantilever beam has a motion similar to a diving board, and the flexure beam is similar to a piston. Either one of these architectures could be used in the DMD display system, with adjustments to the optics to allow for the different motion characteristics of the systems.

Figure 5:
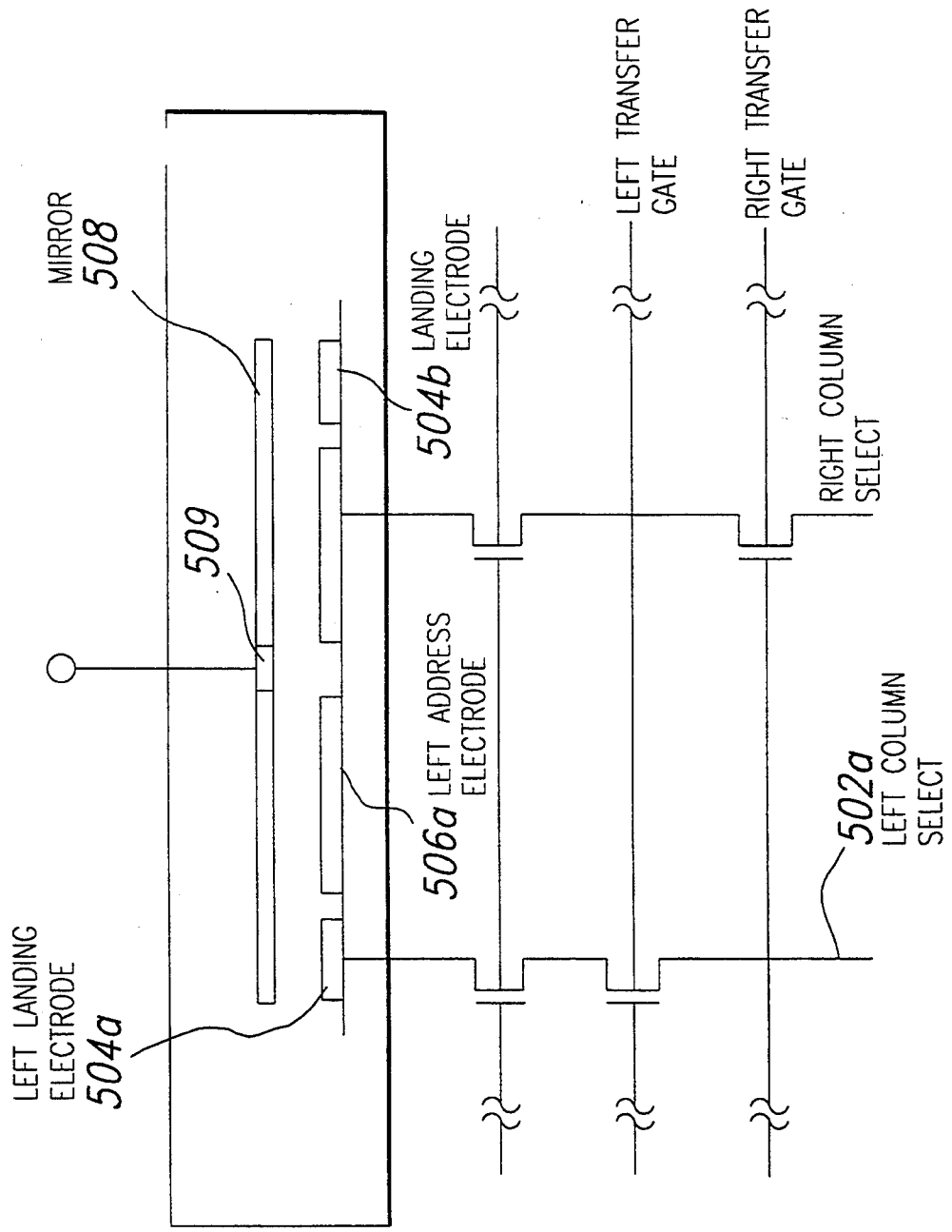
FIG. 5 shows an electronic schematic of a DMD cell.

The operation of the architectures is also similar, except that the cantilever and flexure beam architectures typically have only one addressing electrode. The torsion beam is unique in that it has three distinct, digitally addressed states: flat, twisted to one side, or twisted to the other. A side view of the torsion beam is shown in FIG. 5 "with the torsion beam position shown at 509"; (see accompanying drawing change).

In FIG. 5, if the left column select line 502a is activated, it places a voltage on the left addressing electrode 506a. The voltage causes electrostatic attraction between the mirror element 508 and the addressing electrode 506a. The mirror 508 deflects and the tip lands on the left landing electrode 504a. The landing electrodes 504a and 504b are held at the same voltage at the mirror 508 to prevent any kind of shorting or current flow, that could result in damage to the addressing circuitry or cause the mirror to stick to the landing electrode.

If the mirror is deflected, incoming light would then be deflected at an angle. The mirror element can deflect to the right in the same manner as it deflects to the left. This has many advantages, not the least of which is that the two directions can be ON and OFF, keeping light from the mirrors in the OFF state from reaching into the imaging system for the ON state mirrors.

Figure 6:
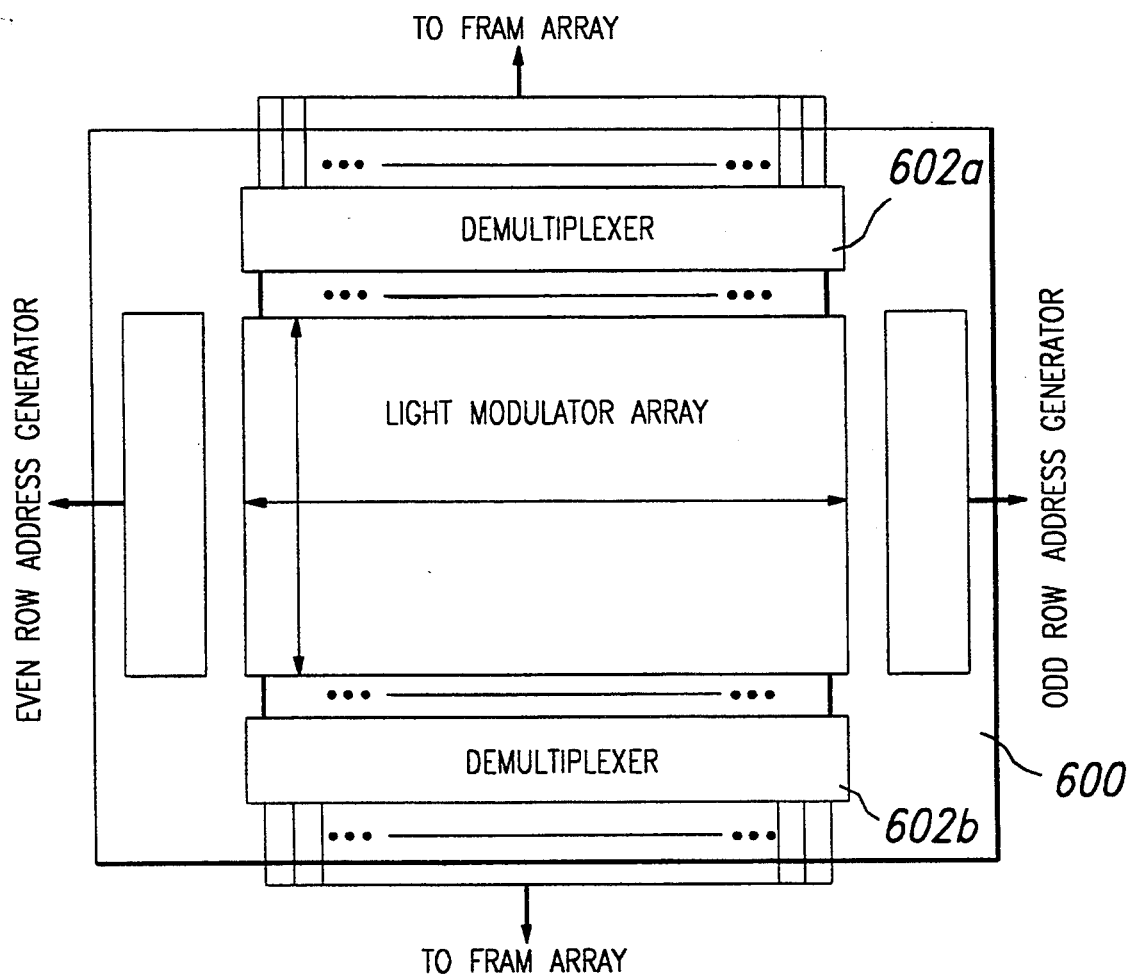
FIG. 6 shows a schematic example of drive electronics surrounding an array.

The DMD layout is shown in FIG. 6. The central array 600 of 2048×1152 pixels is addressed by a CMOS DRAM circuit. The large cell size (20 $\mu$m) will allow the use of relaxed design rules circuits necessary to recover yield lost to the large chip size. The upper 576 lines are addressed from a 512-line to 2048-line, 4:1 demultiplexer 602a at the top of the chip. A second demultiplexer 602b feeds the bottom 576 lines. The resultant 1024 input lines are fed at 107 MHz, so that the demultiplexer outputs run at 26.8 MHz. This 26.8 MHz line rate yields an 46.5 kHz frame rate.

The 46.5 kHz frame rate is adequate to allow the display to be updated 256 times during a single color-sequential video frame. Thus, a projector based on a single DMD chip could partition the video frame into three time-slices and filter the illuminating light sequentially red, green, and blue in those time-slices. Within each time-slice, intensity will be pulse-width modulated (PWM) with a resolution of 256 discrete intervals. Thus, the full projector contrast ratio would be available at each pixel in each of 256 discrete steps in each of the triad colors.

The DMD input demultiplexer must be capable of supporting a 107 MHz input data stream to achieve a 26.8 MHz line rate. In practice, this data rate need not be maintained continuously. As shown in FIG. 3, eight bits of grey scale data transferred to the DMD are adequate to control the 256 time slices in the 5.5 msec one-third frame time. One bit of data for each pixel (the Most-Significant Bit or MSB) is transferred to the DMD at the beginning of a one-third frame time. The next-MSB of data is transferred to every pixel one-half way through the one-third frame time. The third most significant bit at three-quarters of the frame time (one-half, plus one-half of one-half) and so on until all eight bits have been transferred to the DMD. Each bit is allowed to determine each pixel's on/off status for an amount of time proportional to each bit's relative weighting.

Specifically in FIG. 3, line 302 shows the interval of a one-third frame time, which would be allocated to any given color. Line 304 shows the master timing pulses, where each pulse is the beginning of a new bit of data for an eight-bit color interval. 304a is the MSB, 304b is the next MSB, etc. leaving 304h as the least significant bit (LSB). Line 306 shows an implementation of the pulse-width modulation for the bit pattern 10011101 or 159. Line 308 shows an implementation for bit pattern 01100011, or 99. At master timing pulse 304a, for example, the MSB 306a is high for a weight of 128. The signal is low for the next two values, 64 and 32. At pulse 304d the signal 306b goes high for the weights 16, 8 and 4. At pulse 304g it goes low, for the weight 2, then high at 304h, for the weight 1. The total weight of that pattern is 128+16+8+4+1, or 159.

This type of addressing reduces the average bandwidth of data transferred to the DMD, but requires data to the DMD to be in bit planes rather than pixel planes. Hence, the buffer memory shown in FIG. 1 in combination with the memory on-board the DMD substrate must include a data reformatting feature that resequences data out of the pixel plane format received at the memories' inputs to the bit plane format required by the memories' outputs.

Because of the efficiency provided by this addressing method, each of the 576 lines driven by a single demultiplexer must be addressed only eight times in the 5.5 ms one-third frame segment. This equates to a time-averaged data rate of 838 kHz at each vertical column of the DMD array, which yields a 4× data rate increase to 3.35 MHz per pin at both of the 512-bit wide DMD input data ports. Thus, layers of memory buffer just inside each DMD data pin could lower the peak input data rate from 107 MHz toward the average data rate of 3.35 MHz. One layer's worth of buffer at each input data pin would lower the required input data rate from 107 MHz to 53.5 MHz. Two bits of buffer would lower this rate to 27.7 MHz, and so on.

Figure 7A:
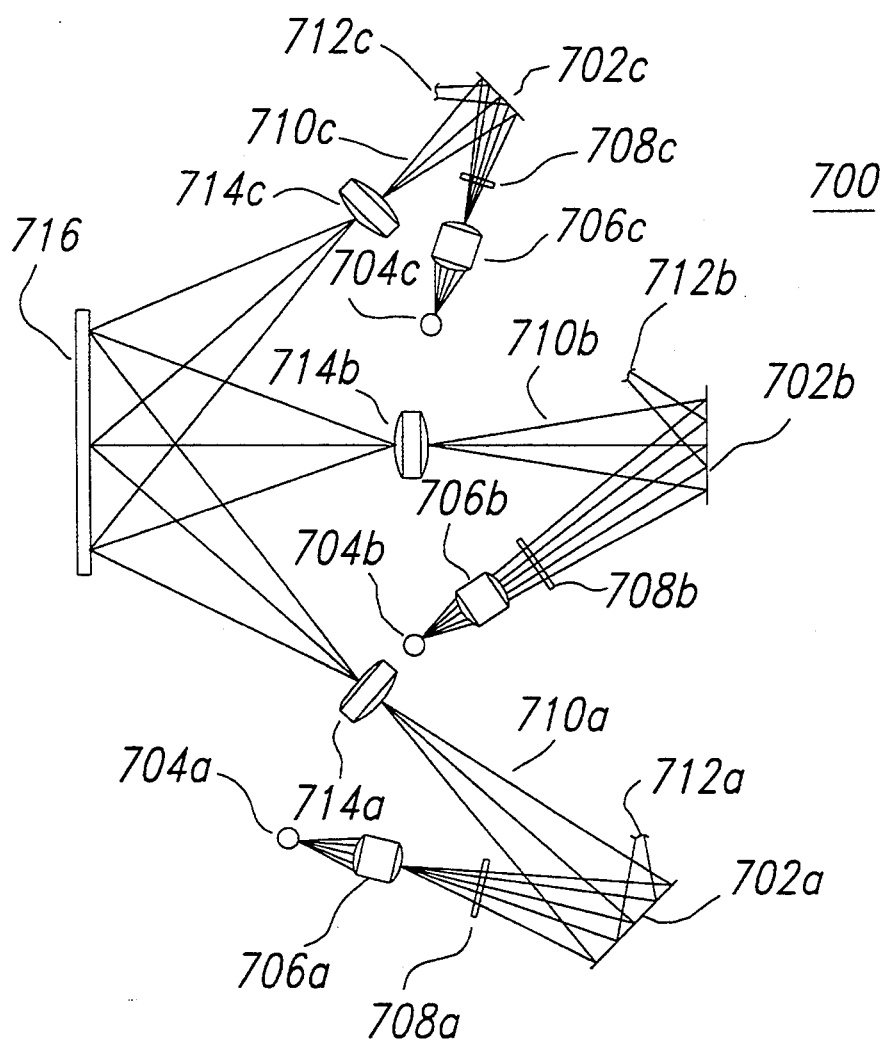
FIGS. 7a–7c shows various configurations of optical systems for the DMD array.
Figure 7B:
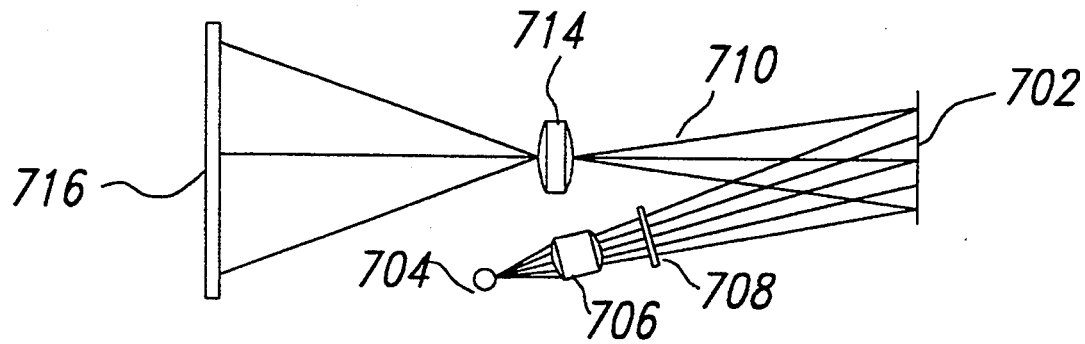
Figure 7C:
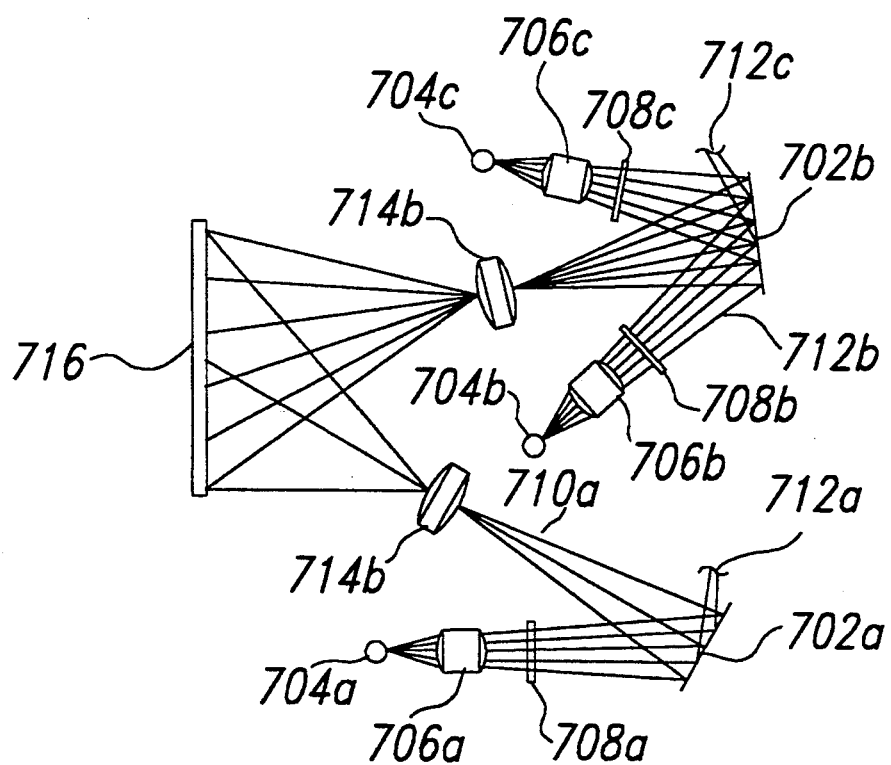

Being able to address the DMD as needed for high-resolution color display leaves several options open as to the optical system design. Some examples of these are shown in FIGS. 7a–7c. FIG. 7a shows a three-chip system, where each device has its own illumination of the appropriate color. For discussion purposes, the picture towards the bottom of the drawing will be discussed as the "blue" system. Light source 704a is a blue source, which could be an actual blue bulb, or a white light source with a blue filter (shown here). The light from source 704a is expanded by lens 706a and transmitted through a blue filter 708a. The blue light then strikes the surface of the blue device 702a. Each individual mirror on device 702a represents a spot on the screen. A snapshot in time is shown by the mirrors in this figure.

Path 712a represents the light from those pixels that are not reflecting the light to the screen 716. These pixels could either be pixels that have no blue light at all in their color scheme, or pixels that have some mix or blue in their scheme and are "off" for that particular bit. Path 710a represents those pixels that are reflecting light to the screen 716. Similar to those pixels that are not reflecting light to the screen, these pixels could be either all blue, or just happen to be at a bit where they are putting blue on the screen as part of that pixel's color scheme. The light in path 710a is focused on the screen 716 by imaging lens 714a.

This individual color system is replicated in this example for green and red light. For completeness purposes, the system of light source 704b is the green light system, and the system of light source 704c is the red light system. These systems can be positioned as needed and do not need to be in the positions shown here. When properly positioned and filtered, the three colored beams of light can be derived from a single white source.

There are several reasons why a 3-chip system may be desirable. Depending upon the size of the system and the optical components used, it may afford a higher brightness and better final picture. However, as described earlier, it may be too expensive. Using three devices, filters and optical systems may prove too costly or too large for a lower-end or smaller system. Another example of the many options available is shown in FIG. 7b.

The light source 704 in FIG. 7b is a white light source. The light passes through the condenser assembly 706 and through a color filter 708, which must be able to provide blue, green and red light to the device 702. One method to achieve this is to use a color wheel and time the data on the device to correspond to the color sequencing of the wheel. This manner of sequencing the light requires that the device 702 "process" (turn on and off each pixel the requisite number of times) the data for each color separately. Again, the light going to the screen 716 for each color will follow path 710 through imaging lens 714. The light for each color not being transmitted to the screen will travel along path 712. The data handling here is a bit more complex, because of the amount of data that must be sequenced, but the optical system is much simpler than the three-chip system.

An intermediate system between the two is shown in FIG. 7c as a two-chip example. Device 702b sends light from one of two sources 704b or 704c. If it is deflected in one direction, the light from the blue system 704c, 706c, 708c, is reflected to screen 716. If the mirror is deflected in the other direction, light from the red system 704b, 706b, 708b is reflected to the screen 716. Path 712c represents the unused light from the red system and 712b represents the unused light from the blue system. The unused light is light reflected off of the undeflected mirrors, and the hinges and posts of the DMD structures. Light from source 704a is filtered by 708a to provide the green portion of the image. A system is dedicated to the green light due to the eye's increased sensitivity to green. As in the three chip system, the optics may be rearranged to use one source for all optical trains.

As demonstrated above, the use of a digital spatial light modulator such as the DMD allows the system designers to select several system designs or configurations. The DMD-based display has the previously discussed advantages of fast response time, low cost and better definition, and comparable brightness and contrast. Additionally, as demonstrated above, it can be adapted to all different types of display needs and desires.

Thus, although there has been described to this point particular embodiments of a digital micromirror device display it is not intended that such specific references be considered as limitations upon the scope of this invention except in-so-far as set forth in the following claims.

What is claimed is:
1. A display system comprising:
   a. a source of digitized video data, wherein said source decodes an incoming signal to locate image information and recognize any format of said data;
   b. a video memory for receiving said image information in said format from said source;
   c. a signal processor for receiving said image information from said video memory and processing said information for display, wherein said processor is operable to perform interlace to progressive scan conversion;
   d. a buffer memory for receiving said processed information from said processor;
   e. at least one digital micromirror device for receiving said processed information from said buffer memory, each said device including an array of individually addressable cells and addressing circuitry, wherein said addressing circuitry receives said processed information for said individually addressable cells such that each of said individually addressable cells responds to said processed information;
   f. at least one light source for illuminating said individual cells during the interval when said individual cells are responding to said addressing information; and
   g. optics such that light reflected from those said individual cells receiving information operative to change the angle of deflection of said cell is captured and focused on a display surface.

2. The system of claim 1 wherein said source of digital video data further comprises a receiver, a tuner and a digitizer.

3. The system of claim 1 wherein said source of digital video data further comprises a receiver and a tuner.

4. The system of claim 1 wherein said source of digital video data is a non-broadcast analog video source.

5. The system of claim 1 wherein said source of digital video data is a non-broadcast digital video source.

6. The system of claim 1 wherein said buffer memory comprises at least one first-in-first-out buffer.

7. The system of claim 1 wherein said buffer memory is operative to perform a pixel-plane to bit-plane reformatting.

8. The system of claim 1 wherein said buffer memory comprises at least one random-access memory.

9. The system of claim 8 wherein said buffer memory comprises at least one video random-access memory.

10. The system of claim 8 wherein said buffer memory comprises at least one frame random-access memory.

11. The system of claim 1 wherein said at least one digital micromirror device further comprises two digital micromirror devices, one for receiving two of either red, green or blue, and one for receiving the remaining color.

12. The system of claim 1 wherein said at least one digital micromirror device further comprises three digital micromirror devices, one for receiving red light, one for receiving blue light and one for receiving green light.

13. The system of claim 1 wherein said buffer memory, said addressing circuitry and said array of individual cells are all contained on one substrate.

14. The system of claim 1 wherein the on-state of each mirror is set coincident with a series of pulses, one for each bit of digital intensity level, wherein each said pulse has a temporal length proportional to each bit's weighting of said digital intensity level.

15. A display system comprising:
 a. a source of digitized video data, wherein said source decodes an incoming signal to locate image information and any format within said data;
 b. a video memory for receiving said image information in said format from said source;
 c. a signal processor for receiving said image information from said video memory and processing said image information for display, wherein said processor is operable to perform interlace to progressive scan conversion;
 d. a buffer memory for receiving said processed information from said processor;
 e. a digital micromirror device for receiving said processed information from said buffer memory, each said device including an array of individually addressable cells and addressing circuitry, wherein said addressing circuitry receives said processed information for said individually addressable cells such that each of said individually addressable cells responds to said processed information;
 f. a light source for illuminating said individual cells during the interval when said individual cells are responding to said addressing information, wherein said light source sequences red, green and blue light onto said individual cells; and
 g. optics such that light reflected from those said individual cells receiving information operative to change the angle of deflection of said cell is captured and focused on a display surface.

16. The system of claim 15 wherein said source of digital video data further comprises a receiver, a tuner and a digitizer.

17. The system of claim 15 wherein said source of digital video data further comprises a receiver and a tuner.

18. The system of claim 15 wherein said source of digital video data is a non-broadcast analog video source.

19. The system of claim 15 wherein said source of digital video data is a non-broadcast digital video source.

20. The system of claim 15 wherein said buffer memory comprises at least one first-in-first-out buffer.

21. The system of claim 15 wherein said buffer memory comprises at least one random-access memory.

22. The system of claim 21 wherein said buffer memory comprises at least one video random-access memory.

23. The system of claim 21 wherein said buffer memory comprises at least one frame random-access memory.

24. The system of claim 15 wherein said at least one digital micromirror device further comprises two digital micromirror devices, one for receiving two of either red, green or blue, and one for receiving the remaining color.

25. The system of claim 15 wherein said at least one digital micromirror device further comprises three digital micromirror devices, one for receiving red light, one for receiving blue light and one for receiving green light.

26. The system of claim 15 wherein said buffer memory, said addressing circuitry and said array of individual cells are all contained on one substrate.

* * * * *